Sept. 26, 1944.  A. C. DURDIN, 3D  2,359,025
AERATION APPARATUS
Filed Dec. 26, 1941  2 Sheets-Sheet 1
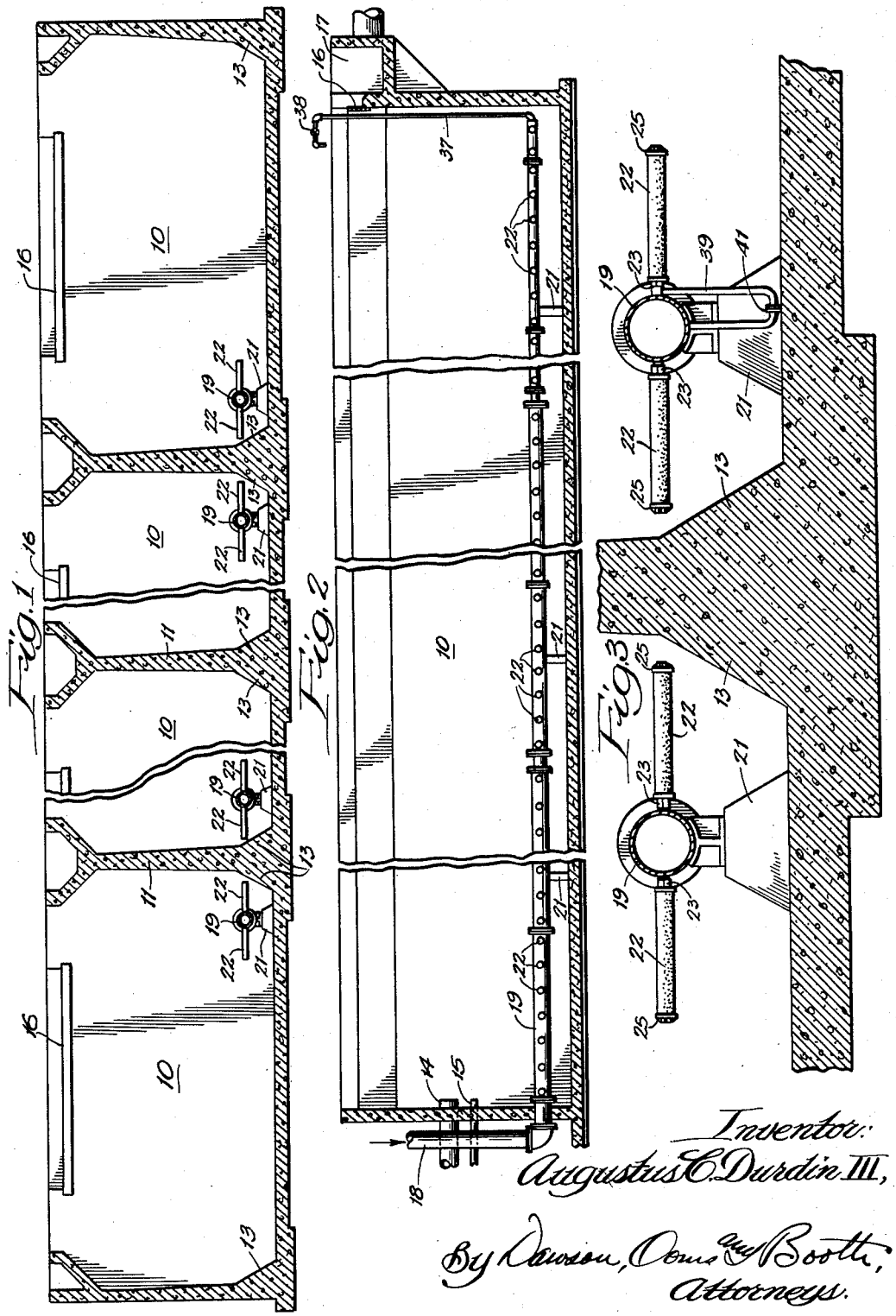
Inventor:
Augustus C. Durdin III,
By Dawson, Ooms and Booth,
Attorneys.

Sept. 26, 1944.  A. C. DURDIN, 3D  2,359,025
AERATION APPARATUS
Filed Dec. 26, 1941  2 Sheets-Sheet 2
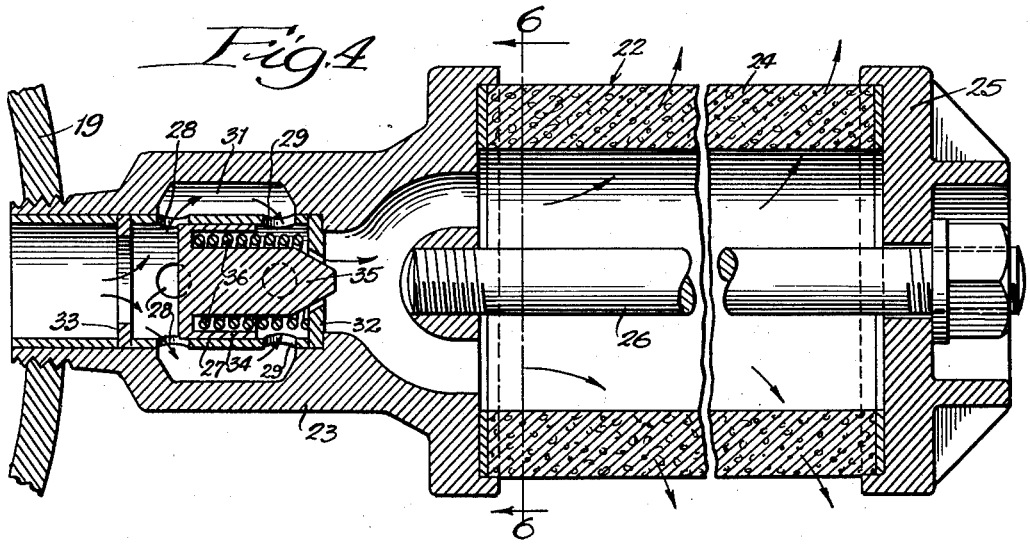
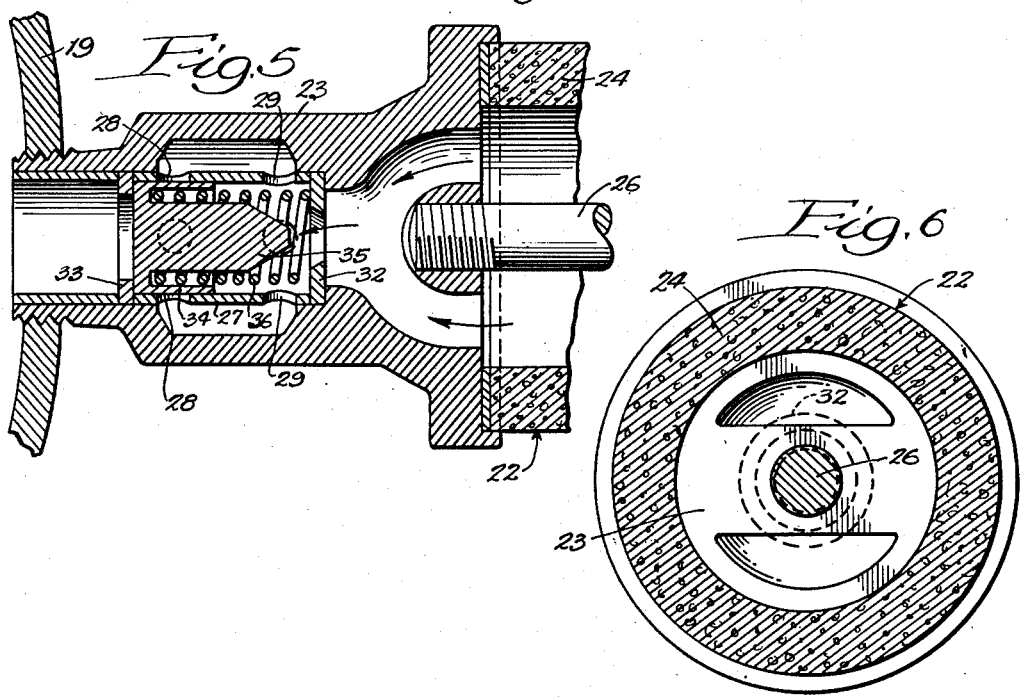
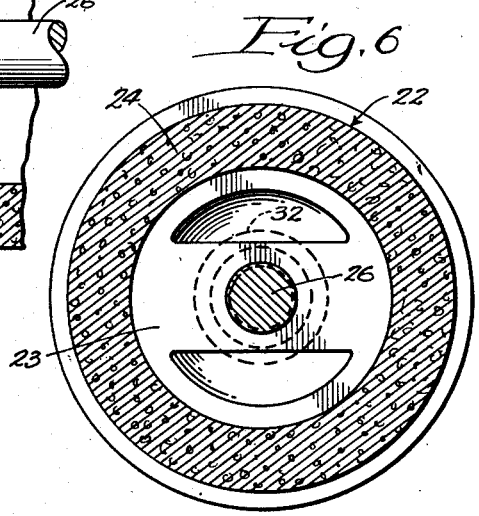
Inventor:
Augustus C. Durdin III.
By Dawson, Ooms & Booth
Attorneys.

Patented Sept. 26, 1944

2,359,025

UNITED STATES PATENT OFFICE 2,359,025

AERATION APPARATUS

Augustus C. Durdin, III, Skokie, Ill., assignor of twenty-four per cent to Lewis H. Durdin, Franklin, Pa., and fifty-two per cent to Augustus C. Durdin, Jr., Chicago, Ill.

Application December 26, 1941, Serial No. 424,441

6 Claims. (Cl. 261—124)

This invention relates to aeration apparatus and more particularly to apparatus for diffusing air below the surface of a body of liquid, as for example in the aeration of sewage.

One of the objects of the invention is to provide an aeration apparatus including a plurality of submerged diffusers in which the rates of flow through the diffusers are maintained substantially constant, regardless of variations of resistance in the diffusers. Thus, if one or more diffusers become partially clogged to increase their resistance, or are cracked or broken to decrease their resistance, the flow of air or other gas therethrough will be maintained constant, regardless of the variations of the resistance of the diffuser elements.

Another object of the invention is to provide an aeration apparatus including a plurality of diffusers in which the amount of air discharged through each diffuser may be easily controlled, so that the total air discharged may be distributed through the liquid as desired.

Still another object of the invention is to provide aeration apparatus in which back flow of liquid through the diffusers is prevented.

Another object of the invention is to provide an aeration apparatus in which any liquid collected in the air lines is automatically removed therefrom.

The above and other objects and advantages of the invention will be apparent from the following description when read in connection with the accompanying drawings, in which:

Figure 1 is a transverse section through a sewage aeration tank embodying the invention;

Figure 2 is a longitudinal section at right angles to Figure 1;

Figure 3 is an enlarged partial section similar to Figure 1;

Figure 4 is an enlarged section through a diffused tube;

Figure 5 is a partial section similar to Figure 4, showing the valve in a different position; and Figure 6 is a transverse section on the line 6—6 of Figure 5.

The sewage treating apparatus shown in Figures 1 and 2 comprises a series of aerating tanks 10 formed of any suitable material such as concrete, and having longitudinally extending partitions 11 separating the tanks. The tanks are preferably filleted, as at 13, to facilitate circulation of liquid therein, and are provided at one end with an influent conduit 14 and a conduit 15 for supplying sludge to the tanks. Effluent from the tank passes over a weir 16 at the opposite end, into an effluent conduit 17, from which it may be removed as desired.

The contents of the tank are adapted to be aerated by air or other desired gasses conducted from a compressor (not shown) through a pipe 18 to a series of headers 19 extending longitudinally through the tanks adjacent the lower portion thereof. As shown in Figure 1, the headers are preferably arranged at one side of each tank to cause a circulation of liquid in the tanks due to aeration of the tank contents. The headers 19 are supported on stools 21, which engage them at spaced points along their length, so as to support the headers above the bottom of the tanks.

Each of the headers carries a series of diffuser tubes 22, shown in Figure 4 as formed by a hollow base portion 23 adapted to be threaded into the side of the header and to project horizontally therefrom. At one end the base portion is provided with a recess to receive the end of a porous tube 24, held in place by a closure head 25 connected to the base by a bolt 26. The porous portion 24 may be formed of any desired material such as Carborundum, carbon, or the like, which will pass a gas and break it up into small bubbles to rise through the liquid in the tanks.

In the operation of sewage apparatus of the type generally described so far, it has been found that the resistance to flow through the several porous elements 24 varies from one element to the other. Furthermore, in use, some of the elements tend to become clogged to a greater extent than others, or some of them may be cracked or broken. Thus, there is a wide variation between the several diffuser tubes in the resistance to flow afforded thereby, so that more air tends to be discharged from some of the tubes than from others, and the air is not properly distributed throughout the contents of the tanks.

According to the present invention, the desired distribution of air is obtained by providing a reducing or regulating valve associated with each of the tubes to maintain the discharge of air therethrough substantially constant, regardless of variations in resistance. As best seen in Figures 4 and 5, the valve is formed by a cylindrical sleeve 27 fitting into the hollow base portion 23 and formed with axially spaced openings 28 and 29 therein. The base portion is provided with an enlarged cavity 31 spanning the openings 28 and 29 to provide communication therebetween. At its outlet end, the sleeve is closed by a plate 32 formed with a valve seat, and a similar plate 33 is secured at the opposite or inlet end of the sleeve to provide both a stop and a valve seat.

A valve member is slidably mounted in the sleeve for cooperation with the seats and the openings therein, and as shown comprises a cylindrical piston portion 34 carrying at its outlet side a valve stem 35 of reduced diameter formed with a tapered end portion for cooperation with the valve seat 32. A compression spring 36 urges the valve member toward the plate 33.

In operation, when the air pressure is cut off, the valve member will be moved to the position shown in Figure 5 by the spring 36, in which it seats against the plate 33 and closes the opening therein. In this position, the valve will prevent back flow of liquid from the tank into the air header so as to prevent it from becoming filled with liquid which might interfere with its subsequent operation. When air pressure is admitted to the header, it will act on the end of the piston portion 34 to move the valve member to the right until the openings 28 are partially uncovered. At this time, air will flow through the openings 28, the cavity 31 and openings 29, and through the seat 32 into the diffuser tube, and liquid in the tube will be forced out therethrough by the air pressure, and thereafter air will pass through the porous portion 24 into the liquid in the tank in the form of fine bubbles.

It will be noted that the valve member is subject to a pressure differential, depending upon the rate of flow therethrough which will determine the force urging the valve member to the right. If the porous element 24 offers an extremely low resistance to pressure on the right end the valve will tend to move further to the right so that the stem 35 will move into the valve seat 32 to throttle the flow and reduce it. If the resistance in the diffuser element 24 should be extremely high, the pressure across the valve member will tend to become more nearly balanced, so that the valve member will move to the left under the influence of the spring 36, opening the valve seat 32 to a greater extent and allowing more air to pass therethrough. The valve member will thus take a position depending upon the differential pressure thereacross, which is, in turn, dependent upon the rate of flow through the valve, so that the flow will be maintained substantially constant through each of the diffuser elements, regardless of variations in resistance in the diffusers themselves.

It is desirable under some conditions to proportion the flow throughout the tank so that a greater quantity of air may be supplied to the liquid at the inlet end of the tank than adjacent the outlet end. This may easily be accomplished with the present invention with uniformly spaced diffuser elements, simply by using springs 36 of different strengths, or by using valve openings of different sizes in the valves in different parts of the tank. Thus, stronger springs or larger valve openings might be employed in connection with those tubes through which a greater quantity of air is desired, while weaker springs or smaller valve openings would be used in the tubes through which less air is desired.

In actual use of the apparatus, a certain amount of liquid may accumulate in the headers due to condensation from the compressed air supply, and to small leakage of liquid past the valves when the air pressure is cut off. This condensation may be removed as shown in Figure 2 by providing a pipe 37 connected to the end of each header and extending above the level of liquid in the tank. A valve 38 on the pipe permits it normally to be shut off, but to be opened when desired so that air pressure in the header will blow any accumulated liquid out through the pipe.

Preferably, the accumulated liquid is removed automatically as illustrated in Figure 3 by providing a tube 39 connected to the lower part of the header and extending downwardly therefrom. The tube 39 may have an upwardly extending vertical leg connected to one of the diffuser tubes 22 to discharge thereinto. The tube 22 to which pipe 39 is connected is isolated from the header 18 so that pipe 39 forms the only inlet thereto. With this construction, any liquid accumulating in the header will flow down into the tube 39 and will be forced therefrom by the air pressure through the diffuser tube 22. If the vertical length of the pipe 39 is such as to provide a liquid head less than the pressure head of the air supply, all of the liquid will be forced from the tube through the diffuser, and thereafter air will be discharged from the same diffuser. It may be desirable in some cases not to attempt to discharge air through the liquid discharge tube and to prevent the flow of air therethrough the tube 39 may be extended downwardly from the header and then upwardly into the liquid in the tank a sufficient distance to provide a liquid trap preventing any discharge of air. In this construction, the diffuser element at the upper end of the liquid discharge tube may be omitted, and the tube may be permitted to open directly into the liquid in the tank, since no air will be discharged therefrom. In this case, a check valve, as for example in the coupling 41, may be provided in the tube 39 to prevent back flow of liquid therethrough when the air is shut off.

In actual use the variation in resistance to passage of air between different diffuser elements may vary as much as 8 to 1. Where the diffusers communicate freely with the header or main air conduit, this means that those diffusers having the least resistance to flow will pass most of the air and may even pass air so freely as to cause a pressure drop in the header so that the diffusers having a high resistance will pass little or no air. When regulating valves according to the present invention are used the total variation in air flow between the different diffusers will be reduced to as little as 2 to 1, even when the air supply pressure is kept at a minimum and will probably never exceed 1.5 to 1, except under extremely severe conditions. By reference herein to maintaining substantially constant flow, it will be understood that I intend to include such variations as these in total flow volume and do not intend to limit myself to flows which are exactly uniform.

It will be understood that the present invention is not limited to use with apparatus containing diffuser tubes of the type shown, but might be employed in connection with diffuser elements of various other types, and that other changes might be made in the construction, as will occur to those skilled in the art. It is, therefore, not intended that the apparatus shown shall be taken as a definition of the scope of the invention, reference being had for this purpose to the appended claims.

What is claimed is:

1. In aeration apparatus including a tank adapted to contain liquid, a conduit in the lower portion of the tank adapted to be connected to a source of gas under pressure, and a plurality of diffuser members communicating with the conduit, the combination of valve means associated with each of the diffuser members for controlling the flow of gas from the conduit thereto and including means forming an inlet valve seat and an outlet port spaced from said seat, a valve member movable between the seat and port, and resilient means urging the valve toward the seat to prevent back flow from the tank, the valve member being movable against said resilient means toward said outlet port in response to the differential pressure acting across the valve, to restrict said port.

2. In aeration apparatus including a tank adapted to contain liquid, a conduit in the lower portion of the tank adapted to be connected to a source of gas under pressure, and a plurality of diffuser members communicating with the conduit, the combination of valve means associated with each of the diffuser members for controlling the flow of gas from the conduit thereto and including a cylindrical sleeve formed with axially spaced openings in its side walls, means forming valve seats at the opposite ends of the sleeve, one communicating with the conduit and the other with the diffuser member, a valve member slidable in the sleeve, resilient means urging the valve member toward said one of the valve seats, and means forming a chamber around the sleeve spanning the axially spaced openings.

3. In aeration apparatus including a tank adapted to contain liquid, a conduit in the lower portion of the tank adapted to be connected to a source of gas under pressure, and a plurality of diffuser members communicating with the conduit, the combination of valve means associated with each of the diffuser members for controlling the flow of gas from the conduit thereto and including a cylindrical sleeve formed with axially spaced openings in its side walls, means forming valve seats at the opposite ends of the sleeve, one communicating with the conduit and the other with the diffuser member, a valve member slidable in the sleeve having a piston part facing said one valve seat and a reduced stem cooperating with the other valve seat, a spring urging the valve member toward said one valve seat, and means forming a chamber around the sleeve spanning the axially spaced openings.

4. Aeration apparatus comprising a tank adapted to contain liquid to be aerated, a header in the lower portion of the tank for conducting gas under pressure into the tank, a plurality of diffusers connected to the header for diffusing gas therefrom through the liquid in the tank, and a double acting valve in each of the connections between the header and diffusers comprising a valve body and a single valve element, said element being movable in one direction to prevent back flow from the diffuser into the header and movable in the other direction in response to the differential pressure thereacross variably to throttle the gas flow therethrough to the diffuser.

5. Aeration apparatus comprising a tank adapted to contain liquid to be aerated, a header in the lower portion of the tank for conducting gas under pressure into the tank, a plurality of diffusers connected to the header for diffusing gas therefrom through the liquid in the tank, conduit means having a vertical leg extending downwardly from the header to drain liquid therefrom and a vertical leg extending upwardly in the tank to a point below the liquid level, and a diffuser connected to the upper end of the last named vertical leg.

6. Aeration apparatus comprising a tank adapted to contain liquid, a header in the lower part of the tank adapted to be connected to a source of gas under pressure, and a diffuser connected to the header including a hollow base secured to the header and having an enlarged cavity between its ends, a porous diffuser connected to the base, a sleeve in the base spanning the cavity and having axially spaced openings in its sides, a valve seat at the outlet side of the sleeve, a piston slidable in the sleeve, a valve member of reduced diameter carried by the piston for cooperation with the seat, a spring urging the piston away from the seat, and a second valve seat at the opposite end of the sleeve for cooperation with the piston.

AUGUSTUS C. DURDIN, III.